UNITED STATES PATENT OFFICE.

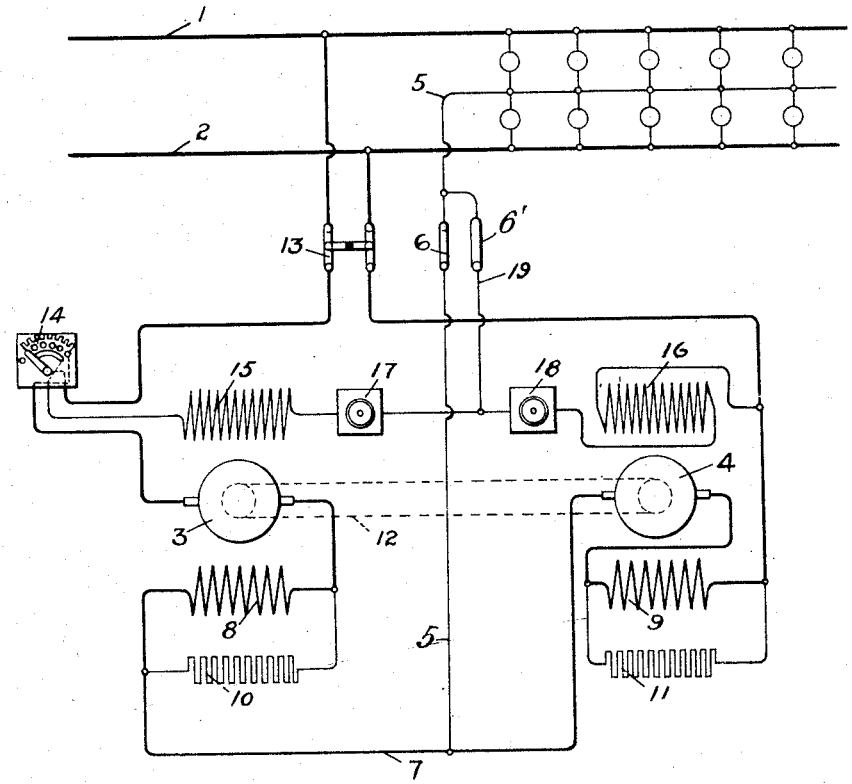

LOUIS E. UNDERWOOD AND RICHARD W. DOUGLASS, OF LYNN, MASSACHUSETTS, ASSIGNORS TO GENERAL ELECTRIC COMPANY, A CORPORATION OF NEW YORK.

BALANCER SET.

No. 881,636.

Specification of Letters Patent.

Patented March 10, 1908.

Application filed October 1, 1904. Serial No. 226,750.

*To all whom it may concern:*

Be it known that we, LOUIS E. UNDERWOOD and RICHARD W. DOUGLASS, citizens of the United States, residing at Lynn, in the county of Essex and State of Massachusetts, have invented certain new and useful Improvements in Balancer Sets, of which the following is a specification.

This invention relates to systems of electrical distribution of the well known two-wire, three-wire type in which compensating machines are used to balance the load between the two main conductors and the neutral wire of the three-wire circuit. In such systems the armatures of the two compensating machines are ordinarily connected in series between the two main conductors and the neutral wire is connected to a point between the two armatures.

The machines are direct connected and when the system is perfectly balanced both machines run as motors taking from the line only sufficient current to overcome the friction and other losses of the machines. If, however, the three-wire system becomes unbalanced because of the increase in load between either of the main conductors and the neutral wire, thereby lowering the voltage on that leg of the system, the machine connected across that leg no longer runs as a motor, for the counter-electromotive force then equals or exceeds the impressed electromotive force and the losses of the two machines is supplied by power from the other leg of the system. With a still further over-loading the compensating machine will operate as a generator supplying current to the overloaded leg of the system, being driven by the machine connected to the leg having the light load. So much of the system herein described is old and well known and the novelty of the present invention resides in the arrangement of the exciting fields and parts allied therewith whereby an increased flexibility of the system is secured, together with ease of adjustment and other advantages which will be more specifically pointed out in the description and the annexed claims.

In the drawing, 1 and 2 represent the two distributing mains of the system supplied by power from any suitable source. The compensating machines 3 and 4 have their armatures connected in series and to the conductors 1 and 2. The neutral wire 5 is connected to the conductor 7 which joins the two armatures 3 and 4 and includes a switch 6 by which this connection may be interrupted. Series fields 8 and 9 are provided for armatures 3 and 4 and may be shunted by German silver or other suitable resistances 10 and 11. It should be understood, however, that this invention is not confined to a system using compound generators, but is equally applicable to systems using shunt wound machines. The armatures 3 and 4 may be direct connected in any convenient manner as by being mounted on the same shaft, though for convenience of illustration we have shown them connected by the belt 12.

The double-pole switch 13 serves to connect the two armatures to the distributing mains and one of the armatures leads is provided with the starting box 14 of ordinary construction so arranged that the first step of the rheostat completes the field circuit and gives the machines full field, the second step completes the armature circuit through the resistance and subsequent steps cut out portions of this resistance. The shunt fields 15 and 16 are connected in series between the outside armature leads thereby receiving the full voltage of the distributing mains when the circuit is completed through switch 13 and starting box 14. The fields 15 and 16 are provided respectively with the field rheostats 17 and 18 and a conductor 19 connects the neutral wire of the dirtributing system to the field circuit at a point located between the two field rheostats.

The operation of the apparatus is as follows: With the switch 6 and the starting rheostat 14 open, the double-pole switch 13 is closed, after which the field circuit is completed through the starting rheostat 14 and the two machines are brought up to speed in the usual manner. After the machines have attained approximately normal speed the switch 6 may be closed thereby connecting the center of the field circuit with the conductor 7 between the two armatures. The necessity of providing a switch 6 arises from the fact that otherwise only one machine will build up, the other machine being demagnetized owing to the passage of current through the armature instead of through the shunt field before the armature has attained sufficient speed to produce an effective counter-electromotive force.

It will be seen that if the switch 6 is closed before the machines are started there will be several paths for the return to the line of current flowing through field coil 15 and rheostat 17. One path is through conductor 19 and one leg of the consumption circuit; a second is through resistance 18 and the field winding 16; and a third path is through conductor 19 to armature 4 and then through field coil 9 back to the source. The latter path has by far the lowest resistance, so that when the armature circuit is completed in rheostat 14, and the machines begin to revolve, practically all the torque will be furnished by armature 3 and the other machine will not build up a shunt field at all. If then the rheostat 14 is brought to a position in which all the resistance is cut out, armature 3 will be subjected to substantially double its normal voltage and the system will be otherwise unbalanced as will readily appear to a person skilled in the art.

While we have shown the switch 6 as connected directly in the neutral wire it is obvious that it would also be effective if located at 6' in the conductor 19. After the machines have once attained normal speed and the switch 6' has been closed, the field rheostats 17 and 18 may be adjusted at will thus independently varying their respective fields 15 and 16, and so providing a ready means for independently varying the voltages of the two machines as circumstances may require. As each shunt field and its rheostat is subjected to only the voltage between one of the distributing mains and the neutral wire, or in other words to the normal voltage of the armature, standard shunt field windings may be used and the rheostats may be of low resistance, thus providing for the utilization of machines of standard type.

What we claim as new and desire to secure by Letters Patent of the United States, is,

1. In an electrical system, the combination of distributing mains, compensating machines joined by a conductor and connected across said mains, a mechanical connection between said machines, a shunt field for each machine, and means for connecting said shunt fields to said conductor joining said machines or for disconnecting said fields therefrom.

2. In an electrical system, the combination of distributing mains, compensating machines connected across said mains to a neutral conductor and driven by energy received from said mains, a mechanical connection between said machines, shunt fields for said machines normally connected between said distributing mains and said neutral conductor, regulating means in circuit with said shunt fields, and means for preventing abnormal potential across said fields during starting.

3. In an electrical system, the combination of distributing mains, compensating machines joined by a conductor and connected across said mains, a mechanical connection between said machines, shunt fields for said machines, regulating means in each shunt field, and means for connecting said fields to the conductor joining said machines and for disconnecting said fields therefrom.

4. In an electrical system, the combination of distributing mains, compensating machines connected across said mains and to a neutral conductor, shunt fields connected between said distributing mains and said neutral conductor, and a switch in said neutral conductor between said machines and said shunt field connection.

5. In an electrical system, the combination of distributing mains of a three-wire circuit connected to a source of supply, compensating machines driven by energy derived from said mains and normally connected across said mains to the neutral conductor of said three-wire circuit, a shunt field for each machine, regulating means in each shunt field, means for connecting said shunt fields to said neutral conductor, and means for opening a connection between said fields and said armatures during the interval of starting.

6. In an electrical system, the combination of distributing mains, compensating machines having their armatures connected across said mains and to a neutral conductor, a field for one of said machines normally connected in shunt with its armature through a switch which can be opened during the operation of starting, and a field for the other of said machines.

7. In an electrical system, the combination of distributing mains, compensating machines having armatures connected across said mains and to a neutral conductor, a shunt field for each of said machines normally connected in shunt with its armature through a switch which can be opened during the starting to prevent abnormal voltage on one of said shunt fields.

8. In an electrical system, a three-wire consumption circuit, compensating machines having their armatures connected in series between the main conductors of said three-wire circuit, shunt fields operatively related to said armatures and connected in series across said main conductors, and a switch for connecting or disconnecting the conductor which joins said armatures to the conductor which joins said fields.

In witness whereof, we have hereunto set our hands this 28th day of September, 1904.

LOUIS E. UNDERWOOD.
RICHARD W. DOUGLASS.

Witnesses:
JOHN A. MCMANUS, Jr.,
DUGALD MCK. MCKILLOP.